United States Patent
Mackenzie

[15] 3,638,119
[45] Jan. 25, 1972

[54] INDEX MOUNTINGS FOR ELECTRICAL METERS

[72] Inventor: Elbert K. Mackenzie, North Wales, Pa.
[73] Assignee: Electro-Mechanical Instrument Co., Inc., Perkasie, Pa.
[22] Filed: June 13, 1969
[21] Appl. No.: 832,924

[52] U.S. Cl. .............................................. 324/156, 324/115
[51] Int. Cl. ........................................ G01r 1/04, G01r 1/08
[58] Field of Search .............................. 324/156, 115

[56] References Cited

UNITED STATES PATENTS 2,612,132  9/1952  Triplett .............................. 324/156 X

FOREIGN PATENTS OR APPLICATIONS 120,970  2/1946  Australia .............................. 324/156

OTHER PUBLICATIONS

A. D. Bedrosian; Electrical Manufacturing Aug. 1954; pp. 102–105.

Primary Examiner—Alfred E. Smith
Attorney—Woodcock, Washburn, Kurtz & Mackiewicz

[57] ABSTRACT

In an industrial-type electrical meter, a transparent molded plastic bezel has molded index grooves in the periphery thereof so that the meter can be mounted in an indexed bracket in one of several mounting positions without use of tools. One embodiment of the meter has an interchangeable dial. Another embodiment of the meter has a weatherproof seal. Still another embodiment can be easily installed in an explosionproof case.

8 Claims, 10 Drawing Figures

PATENTED JAN 25 1972

INDEX MOUNTINGS FOR ELECTRICAL METERS

BACKGROUND OF THE INVENTION

This invention relates to industrial-type electrical meters and more particularly to electrical meters which can be quickly and easily installed.

Electrical meters for industrial-type applications must be extremely rugged in service. For example, in chemical processing plants or oil refineries an extremely large number of meters are provided to monitor system parameters. The moving magnet type of meter has desirable characteristics for these applications. Examples of moving magnet-type meters suitable for use in industrial applications are shown in U.S. Pat. No. 2,970,267, Pfeffer; No. 3,094,659, Pfeffer; and No. 3,200,332, Pfeffer.

In addition to being rugged and low cost, moving magnet meters provide high-overload security because there are no current-carrying moving parts. The overload security is much higher than that of moving coil meters.

In industrial applications using a large number of meters, installation and maintenance of the meters is a large problem. Often, skilled electricians or electronics technicians install or replace meters in the electrical circuits.

Another problem is keeping an inventory of meters. While the same basic meter movement may be used in a number of different locations, different dial faces are often required to conform with the particular parameter being measured.

Another problem in industrial applications is that dirt, dust, condensation and humidity often adversely affect the accuracy, and even the operability, of the meter. Still another problem particularly present in chemical plants and oil refineries is the spark hazard of all electrical circuits. For this reason, electrical meters are often installed in explosion cases. The installation or replacement of electrical meters in explosionproof cases has heretofore been difficult and time consuming.

SUMMARY OF THE INVENTION

It is an object of the present invention to provide an electrical meter with a transparent plastic bezel having molded index grooves in the periphery thereof for mounting in one of several positions in an indexed bracket without the use of tools.

It is another object of the present invention to provide an electrical meter having a dial easily interchangeable without disassembly of the meter case.

It is another object of the present invention to provide an electrical meter easily installed in an explosionproof case.

It is another object of the present invention to provide a weatherproof meter normally permanently sealed and having a seal which can be opened without destroying the meter.

It is another object of the present invention to provide a weatherproof meter having a dessicant sealed therein to prevent fogging of the dial face from internal moisture and to prevent corrosion of the meter parts from trapped, internal moisture.

It is another object of the present invention to provide a self-contained meter case having a fitting suitable for mounting the meter directly on a conduit without the use of a bracket, panel, or auxiliary enclosure.

It is another object of the present invention to provide an industrial meter with a concealed external zero adjustment to protect suppressed zero settings.

It is another object of the present invention to provide an electrical meter with easily assembled, polarized, connectors on the meter leads.

DESCRIPTION OF A PARTICULAR EMBODIMENT

Figure 1:
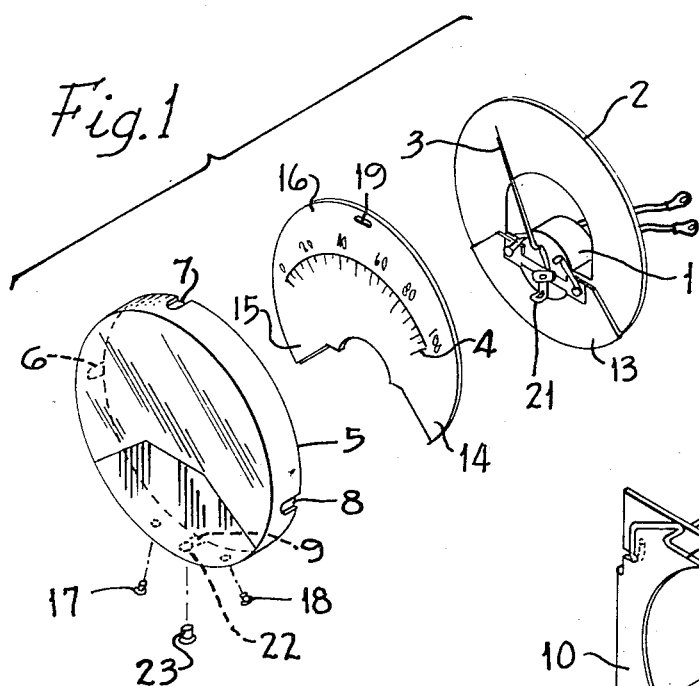
FIG. 1 shows an exploded view of the meter.

Referring to FIG. 1, the meter includes a moving magnet movement 1 positioned in a flanged case 2. The movement drives a pointer 3 over the scale 4. A transparent molded plastic bezel 5 is attached to the case 2 to completely enclose the meter. The transparent bezel 5 and the opaque case 2 are constructed of a high-strength polycarbonate plastic, referred to as Lexan by one supplier.

Figure 2:
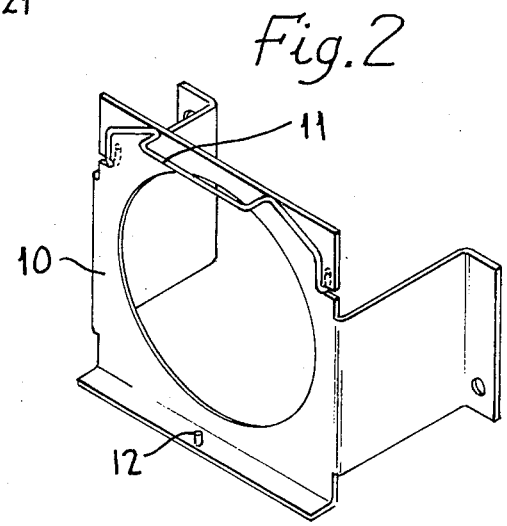
FIG. 2 shows one form of the bracket.
Figure 3:
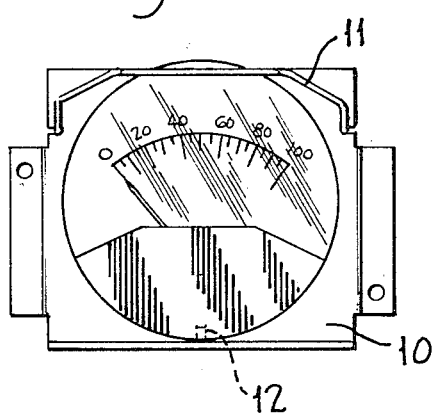
FIG. 3 shows a front view of the meter mounted in the bracket of FIG. 2.

The bezel 5 has four index grooves 6–9 molded therein. The index grooves cooperate with index means on the mounting bracket so that the mounting position of the meter may be easily changed with respect to the bracket. As shown in FIG. 2, the bracket 10 has index means including the retaining clip 11 and the index stud 12. FIG. 3 shows the meter mounted in the bracket. It will be appreciated that the meter can be mounted in any one of four alternate 90° mounting positions with respect to the bracket. Further, the resilient member, or retaining clip 11 can be easily deflected so that the meter can be mounted or its position changed without the use of tools.

In order to provide easy interchangeability of scales, the meter case is constructed with a raised portion 13. The scale 4 is a flat member conforming to the shape of the case 2 throughout at least a portion 16 of the periphery thereof. The remaining portion of the periphery is cut out to form tab portions 14 and 15. The shape of the scale cooperates with the shape of the case and the raised portion 13 to accurately position the scale with respect to the movement 1.

Figure 4:
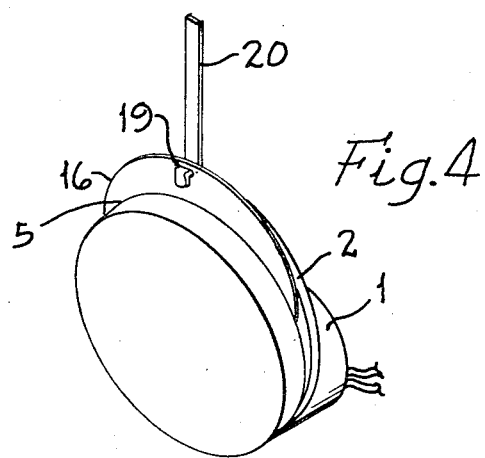
FIG. 4 shows the manner of removing the scale.

The scales are easily interchanged because the bezel 5 is rigidly fastened to the case by the screws 17 and 18 only in the section of the case which contains the raised portion 13. The bezel 5 is temporarily fastened to the case in the remaining section of the case. Because of the resiliency of the case and bezel 5, they can be partially sprung apart to interchange scales, as shown in FIG. 4.

An opening 19 is engaged by the tool 20 to remove the scale from the meter. A new scale can then be inserted and will be positively positioned by the cooperation between the shape of the scale and the shape of the case together with the raised portion.

The meter of FIG. 1 includes the zero adjustment lever 21. The zero adjustment mechanism is of the type shown in U.S. Pat. No. 2,970,267, Pfeffer. In meters for use in industrial applications, it is desirable to have a concealed access to the zero adjustment. The reason for this is that an unskilled person may seriously change the meter calibration by unobvious change in the zero adjustment. Particularly in suppressed zero meters, the lever may be moved considerably without change in the zero position of the pointer.

In order to discourage change in the zero adjustment by unauthorized personnel, the access to the zero adjustment is in a concealed position. Access is by way of the threaded opening 22 located in one of the index grooves. A resilient screw 23 is threaded into the opening to provide a sealed closure of the opening.

MODIFICATIONS OF THE INVENTION

Figure 6:
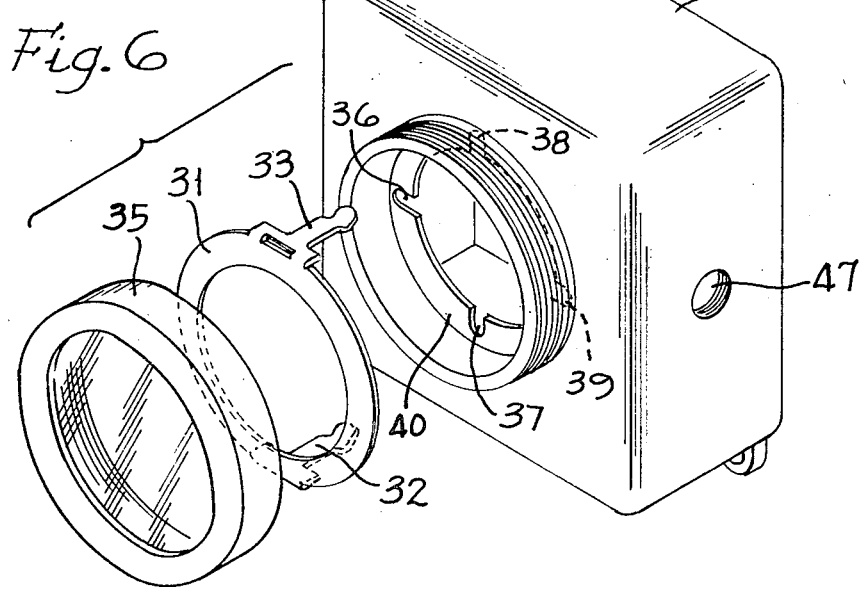
FIG. 6 shows the explosionproof case.

Referring to FIG. 6, the bracket 31 includes the resilient tabs 32 and 33 which snap into the index grooves in the bezel. This mounts the meter of FIG. 1 on the bracket.

The meter of FIG. 1 can then be mounted in the explosionproof case 34 shown in FIG. 6. The bracket 31 with the meter of FIG. 1 attached can be snapped into the case. This case may be a standard rustless cast aluminum housing together with the cover 35. Such cases are available commercially. For example, the case available from Adalet Manufacturing Co., Cleveland, Ohio Catalogue No. XJDFGC is suitable.

The case includes the four index notches 36–39 in the flange 40 around the opening in the case. The resilient tabs 32 and 33 snap into two of the index notches to secure the meter in the explosionproof case.

Figure 5:
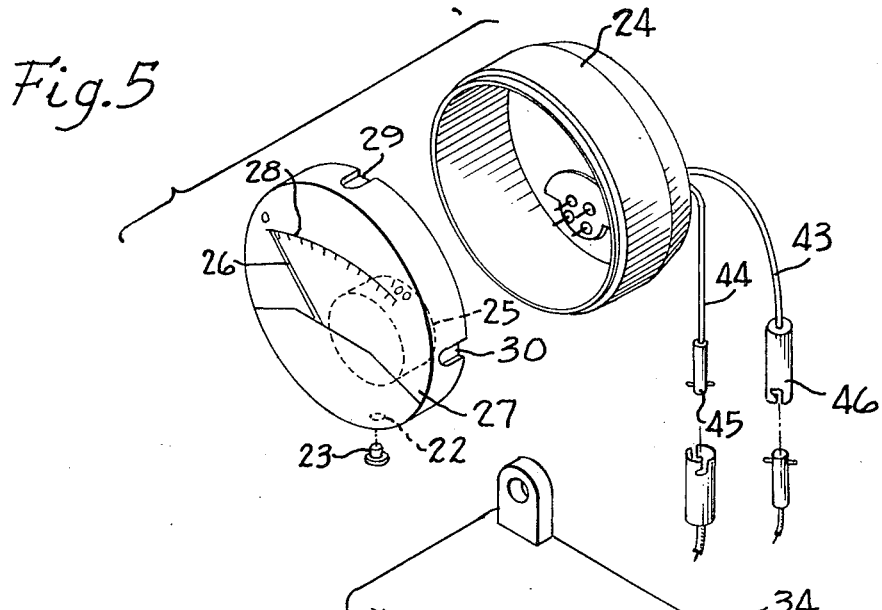
FIG. 5 shows a weatherproof meter.

Note the simplicity with which the meter can be installed in the explosionproof case. The meter merely snaps into the case with no tools required. The connections of the leads to a cable extending through the opening 47 can be made outside of the casing. Mating connectors similar to the connectors 45 and 46 of FIG. 5 are provided on the external connecting cable. This obviates the necessity of making wiring connections within the cramped quarters of the interior of the case, a problem which has beset prior explosionproof meter housing. This permits the use of smaller and less costly cast housings.

Figure 7:
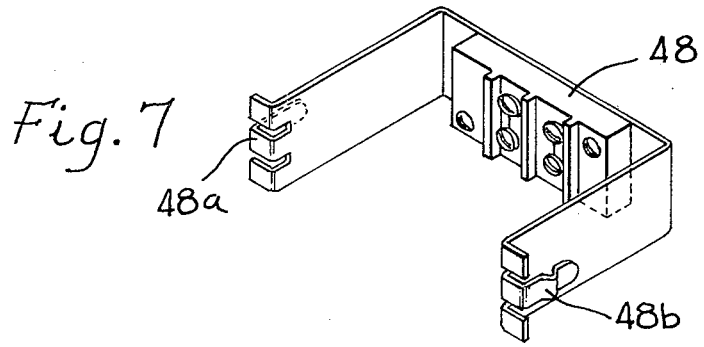
FIG. 7 shows the terminal block subassembly.

In some installations, it may be impractical to use the polarized connectors. In this case, the meter leads terminate in the screw-type connectors shown in FIG. 1. Installation and connection of the meter in the explosionproof case is facilitated in this instance by use of the terminal block 48 shown in FIG. 7. The terminal block subassembly has resilient tabs 48a and 48b which snap into the index notches, for example, 36 and 39, of the casing 34. This secures the terminal block to the casing. Then, the meter can be snapped into the notches 37 and 38 of the casing. Alternately, the meter can be snapped into the opposed set of index notches. Normally, the terminal block is snapped into the set of notches opposed to the notches in which the meter block is snapped.

In applications where corrosive gases and liquids, or dust and dirt and humidity are a problem, it is desirable to have the meter enclosed in a sealed case. These may be referred to as weatherproof meters. The need has long existed for a self-contained, integral one piece sealed meter with provisions for mounting directly to standard industrial conduit fittings.

In accordance with an important aspect of the applicant's invention, there is provided a weatherproof seal which can be opened without destroying the usefulness of the meter. The meter can thereafter be resealed. Further, the seal can be simply and reliably made with a minimum of rejects.

In accordance with another aspect, a zero adjustment can be made without breaking the seal.

Such a meter is shown in FIGS. 5, 7a, 8 and 9. The meter includes the cup-shaped casing 24.

A meter movement is enclosed in the metal movement case 25. The movement drives the pointer 26 over the scale 28. The movement case 25, and scale 28, are permanently mounted on the casing 24. The scale 28 is affixed by two screws to the movement case 25. Bezel 27 has index grooves, the index grooves 29 and 30 being shown.

The meter leads 43 and 44 each terminate in a spring-loaded, insulated shield hand assembled, polarized connector. The male connector 45 and the female connector 46 are provided for connection of the meter into an electrical circuit without the use of tools. Since the connectors are polarized, it is impossible to connect the meter into the circuit improperly.

Figure 7A:
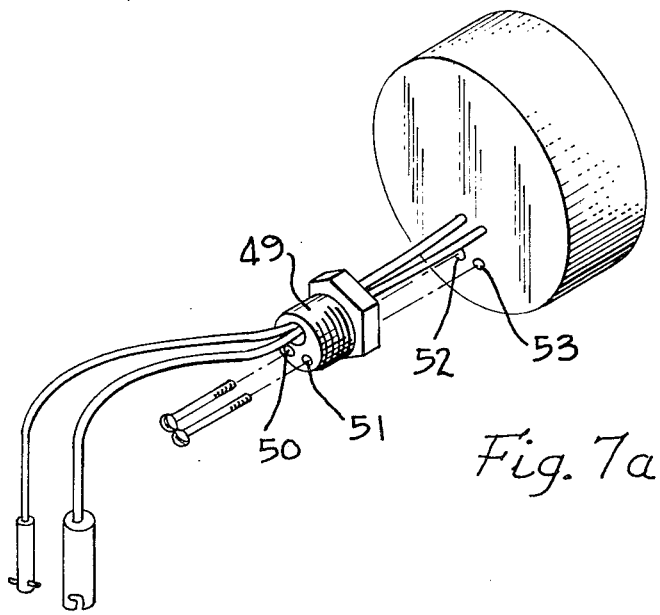
FIG. 7a shows one form of the independently attached mounting fitting.

The meter may be mounted with the independently attached mounting fitting 49 shown in FIG. 7a. The meter leads are brought out through a sealed opening in the case. The leads extend through the fitting 49 which is secured to the case by screws extending through holes 50 and 51 in the fitting. The screws are threaded into blind holes 52 and 53 in the case.

Figure 8:
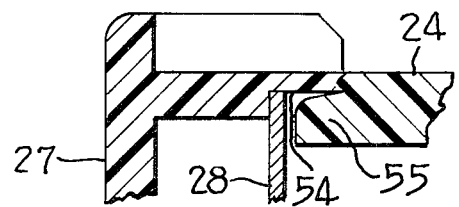
FIG. 8 shows the details of the seal between the case and the bezel.
Figure 9:
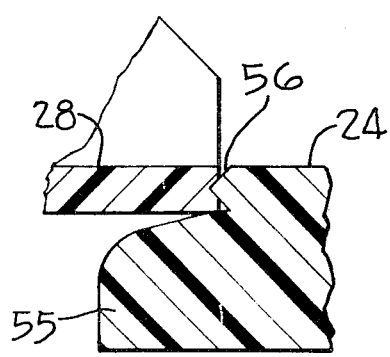
FIG. 9 is an enlarged view of a portion of FIG. 8.

The details of the seal are shown in FIGS. 8 and 9 which depict a cross section of portions of the bezel 28 and the case 24. The bezel 27 has a step 54 cut into the rear circumferential edge of the bezel. The scale 28 abuts the vertical edge of this step. The case 24 has a raised annular ring portion 55 which forms a spigot joint with the bezel. The case also has a wedge-shaped annular ring portion 56. The wedge-shaped portion 56 abuts the rear circumferential edge of the bezel. The bezel is secured to the case so that contact is established only between the wedge-shaped portion 56 of the casing and the rear circumferential edge of the bezel. The two may be secured together by the use of plastic solvent for example. Alternatively, plastic cement or various welding methods may be used.

In using solvent to make the seal, normally, the solvent will not flow inside the angular ring portion 56 and down the ring portion 55 so as to make a seal between the portion 55 and the bezel 28. That is, only the wedge-shaped portion 56 is sealed to the bezel. This can be easily separated from the bezel by running a razor blade around the seal. The meter can thereafter be resealed.

Note that, if the ring portion 56 were not present, the solvent would flow down over the ring portion 55 and might join the inside surface of the bezel, the lower horizontal line of the bezel in FIG. 9, to the ring portion 55. This would produce a seal inaccessible to be cut cleanly when breaking the seal.

Before sealing the meter, it is desirable to include a dessicant material within the meter. Such a dessicant sealed within the meter prevents fogging of the transparent bezel from condensation of internal moisture. For example, dessicant capsules commercially available under the trade name Humi-Caps, Industrial Packaging Product Company, are suitable for use.

The weatherproof meter of FIG. 5 has the zero adjustment opening 22 and resilient closure 23 previously described in conjunction with FIG. 1.

While particular embodiments of the invention have been shown and described, it will be understood that various modifications may be made. The appended claims are, therefore, intended to cover any such modifications within the true spirit and scope of the invention.

What is claimed is:

1. An electrical meter comprising:
   a meter movement energized by an applied electrical signal,
   a case for mounting said meter movement, said case having a raised portion,
   a scale, said scale being a flat member conforming to the shape of said case throughout at least a portion of the periphery thereof and having tab portions cooperating with the raised portion of said case to accurately position said scale with respect to said movement, and
   a pointer driven over said scale by said meter movement.

2. The meter recited in claim 1 adapted to be mounted in a bracket further comprising:
   a bezel for said case, said bezel having integral index means in the periphery thereof, said bracket having index means oppositely mated to said integral index means so that the mounting position of said meter with respect to said bracket may be easily changed.

3. The meter recited in claim 1 further comprising a bezel for said case and wherein said scale has an opening for engagement with tool used to interchange scales on said meters without removing said bezel.

4. The meter recited in claim 1 further comprising a bezel for said case and wherein said bezel is rigidly fastened to said case in the sector of said case which contains said raised portion, the remaining sector of said case being resilient so that said case can be partially sprung from said case to interchange scales.

5. The meter recited in claim 1 further comprising a bezel of transparent molded polycarbonate plastic having index grooves molded in the periphery thereof.

6. An electrical meter comprising:
   a meter movement energized by an applied electrical signal,
   a scale,
   a pointer drive over said scale by said meter movement,
   a case for mounting said meter movement,
   a bezel for said case, said bezel having integral index means in the periphery thereof,
   an outer protective casing having an opening therein, a flange around said opening, and index notches in said flange,
   a first bracket having resilient tabs oppositely mated to said integral index means, said resilient tabs fitting into said notches to secure said meter in said casing.

7. The meter recited in claim 6 further comprising:
   a second bracket having resilient tabs which fit into said notches, and a terminal block mounted on said second bracket.

8. The meter recited in claim 6 wherein the energizing leads for said movement each have a spring-loaded, insulated shield encased, hand assembled, polarized connector thereon for connection of said meter into electrical circuit without the use of tools.

* * * * *